US009251680B2

(12) United States Patent

Alicot et al.

(10) Patent No.: US 9,251,680 B2

(45) Date of Patent: Feb. 2, 2016

(54) PULSE TRANSMISSION SYNCHRONIZATION

(71) Applicants: Jorge F. Alicot, Davie, FL (US); Manuel Soto, Lake Worth, FL (US); John Allen, Pompano Beach, FL (US)

(72) Inventors: Jorge F. Alicot, Davie, FL (US); Manuel Soto, Lake Worth, FL (US); John Allen, Pompano Beach, FL (US)

(73) Assignee: Tyco Fire & Security GmbH, Rheinfall (CH)

( * ) Notice: Subject to any disclaimer, the term of this patent is extended or adjusted under 35 U.S.C. 154(b) by 140 days.

(21) Appl. No.: 14/187,952

(22) Filed: Feb. 24, 2014

(65) Prior Publication Data

US 2015/0243147 A1 Aug. 27, 2015

(51) Int. Cl.

| | |
|---|---|
| ***H04Q 5/22*** | (2006.01) |
| ***H04L 7/00*** | (2006.01) |
| ***G06F 17/00*** | (2006.01) |
| ***G06Q 90/00*** | (2006.01) |
| ***G08B 13/24*** | (2006.01) |

(52) U.S. Cl.

CPC .................................. *G08B 13/2488* (2013.01)

(58) Field of Classification Search

CPC . G06K 7/0008; G06K 7/016; G07C 9/00182; G07C 1/14; Y04S 40/146; G08B 13/2442; B61L 7/088; G06Q 30/02

USPC .................. 340/10.1–10.6, 4.2, 572.1–572.9; 235/474, 375–385

See application file for complete search history.

(56) References Cited

U.S. PATENT DOCUMENTS

| | | | | |
|---|---|---|---|---|
| 4,667,185 | A | 5/1987 | Nourse et al. | |
| 6,201,469 | B1 | 3/2001 | Balch et al. | |
| 6,320,507 | B1 | 11/2001 | Strzelec et al. | |
| 6,812,843 | B2 | 11/2004 | Soto et al. | |
| 2005/0253720 | A1* | 11/2005 | Oakes ................ | G08B 13/2471 340/572.1 |
| 2007/0296591 | A1* | 12/2007 | Frederick ........... | G08B 13/2488 340/572.4 |
| 2008/0107219 | A1 | 5/2008 | Oakes et al. | |
| 2009/0051534 | A1* | 2/2009 | Aguirre ............. | G08B 13/2488 340/572.1 |
| 2010/0148932 | A1* | 6/2010 | Oakes ................ | G08B 13/2488 340/10.2 |
| 2013/0278426 | A1 | 10/2013 | Sayegh | |

FOREIGN PATENT DOCUMENTS

| | | | |
|---|---|---|---|
| EP | 1483752 | A1 | 12/2004 |
| EP | 2562731 | A2 | 2/2013 |
| WO | 2000048148 | A2 | 8/2000 |
| WO | 0178028 | A2 | 10/2001 |
| WO | 2008/002304 | A1 | 1/2008 |

* cited by examiner

*Primary Examiner* — George Bugg

*Assistant Examiner* — Munear Akki

(74) *Attorney, Agent, or Firm* — Robert J. Sacco; Carol E. Thorstad-Forsyth; Fox Rothschild LLP

(57) ABSTRACT

Interference in an electronic article surveillance (EAS) system is reduced by transmitting warning pulse at a predetermined time following the EAS marker exciter pulse. The predetermined time and duration of the warning pulse are chosen so that the warning pulse acts upon a noise interference avoidance process in a second non-cooperative EAS unit. More particularly, the warning electromagnetic pulse causes a timing change in a second synchronized electromagnetic exciter pulse produced by the second EAS unit when the second synchronized electromagnetic exciter pulse is concurrent with the first receive interval. This timing change causes the second EAS unit to no longer interfere with the first EAS unit.

20 Claims, 9 Drawing Sheets

PULSE TRANSMISSION SYNCHRONIZATION

BACKGROUND OF THE INVENTION

1. Statement of the Technical Field

The inventive arrangements relate to electronic article surveillance systems, and more particularly to synchronization of two or more electronic article surveillance systems which have the potential to interfere with one another.

2. Description of the Related Art

Pulsed magnetic EAS systems operate by generating a short burst of magnetic flux in the vicinity of a transmitter antenna. This pulsed field stimulates a particular type of magnetic label or marker, whose characteristics are such that it is resonant at the operating frequency of the system. The marker absorbs energy from the field and begins to vibrate at the transmitter frequency. This is known as the marker's forced response. When the transmitter stops abruptly, the marker continues to ring down at a frequency which is at, or very near the system's operating frequency. This ring down frequency is known as the marker's natural frequency. The vicinity of the transmitter antenna in which the response can be forced is the interrogation zone of the EAS system.

The magnetic marker is constructed such that when the marker rings down, the marker produces a weak magnetic field, alternating at the marker's natural frequency. The EAS system's receiver antenna, which may be located either within its own enclosure or within the same enclosure as the transmitter antenna, receives the marker's ring down signal. The EAS system processes the marker's unique signature to distinguish the marker from other electromagnetic sources and/or noise which may also be present in the interrogation zone. A validation process must therefore be initiated and completed before an alarm sequence can be reliably generated to indicate the marker's presence within the interrogation zone.

The validation process is time-critical. The transmitter and receiver gating must occur in sequence and at predictable times. Typically, the gating sequence starts with the transmitter burst starting with a synchronizing source, such as the local power line's zero crossing. The receiver window opens at some predetermined time after the same zero crossing.

In a three phase power system, power lines within a building can have individual zero crossings at 0°, 120° or 240° with respect to each other. Accordingly, different EAS units plugged into different electrical outlets may detect a zero crossing at either the 0°, 120° or 240° point in the line frequency's period. In this way, a first EAS system, referred to as system A, can have a different zero crossing reference time as compared to a nearby EAS system, referred to as system B.

In order to compare received signals to background noise, separate noise averages are continuously sampled, computed and stored as part of a signal processing algorithm. This is commonly done by operating the EAS systems at 1.5 times the power line frequency, 90 Hz for a 60 Hz line frequency or 75 Hz for a 50 Hz line frequency, and alternating the interpretation of each successive phase. More particularly, if phase A is a transmit phase (the receiver window is preceded by a transmitter burst), phase B will be a noise check phase (the receiver window was not preceded by a transmitter burst), phase C will be a transmit phase, phase A will be a noise check phase, and so on.

EAS systems operating in proximity to each other must be synchronized in some way to prevent them from causing interference with one another. Previous implementations of pulsed magnetic EAS systems have utilized various approaches to ensure synchronization. Some systems are manually synchronized by a technician, and rely on a power line frequency zero crossing as a reference time. Another approach is more automated but requires a wired connection between respective system processor boards of the multiple EAS systems. Other systems utilize wireless synchronization methods. These wireless systems can involve wireless communications among two or more EAS systems that are designed to accommodate such wireless synchronization methods. For example, one such wireless system is disclosed in U.S. Pat. No. 6,201,469 to Balch, et al.

A plurality of EAS systems operating in proximity to one another can be synchronized by the various methods described above, provided that (1) a technician has authorized access to all of the EAS systems which are to be synchronized and/or (2) each of the EAS system is specifically designed to participate in a particular automated synchronization method (wired or wireless) which is being used. But there are some instances where one or more of the EAS systems in a proximate area are not designed to utilize a particular automated synchronization method or are not under the control of a technician who is attempting to manually synchronize operation of two or more EAS systems. For example, this can occur when a plurality of EAS system are made by different manufacturers who utilize different automatic synchronization schemes. Alternatively, this can also occur when EAS units are operated or maintained by a different entities and one of the EAS units has been improperly synchronized by a technician with inadequate training or indifference to the interference problem. EAS systems of this kind can be thought of as non-cooperative EAS systems.

SUMMARY OF THE INVENTION

Embodiments of the invention concern a method for reducing interference in an electronic article surveillance (EAS) system. The method is performed in the context of marker tag detection operations executed by a first EAS unit. The marker tag detection operations include periodically generating with a transmitter a first synchronized electromagnetic exciter pulse which is configured to force a response in the marker tag when the pulse is transmitted into a tag detection zone. The first synchronized electromagnetic exciter pulse is communicated into an EAS tag detection zone during a pulse transmit time. After termination of the pulse transmit time, a receiver is used to monitor and detect the response from the marker tag during a first receive interval. The first EAS unit also transmits a warning electromagnetic pulse at a predetermined time following the exciter pulse. The predetermined time and a duration of the warning electromagnetic pulse are chosen so that the warning electromagnetic pulse acts upon a noise interference avoidance process in a second EAS unit. The warning electromagnetic pulse causes a timing change in a second synchronized electromagnetic exciter pulse produced by the second EAS unit when the second synchronized electromagnetic exciter pulse is concurrent with the first receive interval. Accordingly, the noise interference avoidance processing circuitry of the second EAS unit is used by the first EAS unit to cause a timing change in the second EAS unit. This timing change causes the second EAS unit to no longer interfere with the first EAS unit.

The invention also concerns a system for reducing interference in an electronic article surveillance (EAS) unit. A first EAS unit includes a transmitter, a receiver and a controller arranged to control operation of the receiver and the transmitter. The controller is arranged to control marker tag detection operations in the first EAS unit by causing the transmitter to periodically generate a first synchronized electromagnetic exciter pulse configured to force a response in the marker tag when the first synchronized electromagnetic exciter pulse is transmitted into a tag detection zone. The controller causes the first synchronized electromagnetic exciter pulse to be transmitted into an EAS tag detection zone during a pulse transmit time, and after termination of the pulse transmit time, causes the receiver to monitor to detect the response from the marker tag during a first receive interval. The controller is further arranged to cause the transmitter to transmit a first warning electromagnetic pulse at a predetermined time following the exciter pulse. The controller selects the predetermined time and a duration of the first warning electromagnetic pulse so that the first warning electromagnetic pulse will act upon a noise interference avoidance system in a second EAS unit. This action will cause a timing change for a second synchronized electromagnetic exciter pulse produced by the second EAS unit when the second synchronized electromagnetic exciter pulse is concurrent with the first receive interval.

BRIEF DESCRIPTION OF THE DRAWINGS

Embodiments will be described with reference to the following drawing figures, in which like numerals represent like items throughout the figures, and in which.

DETAILED DESCRIPTION

Figure 1:
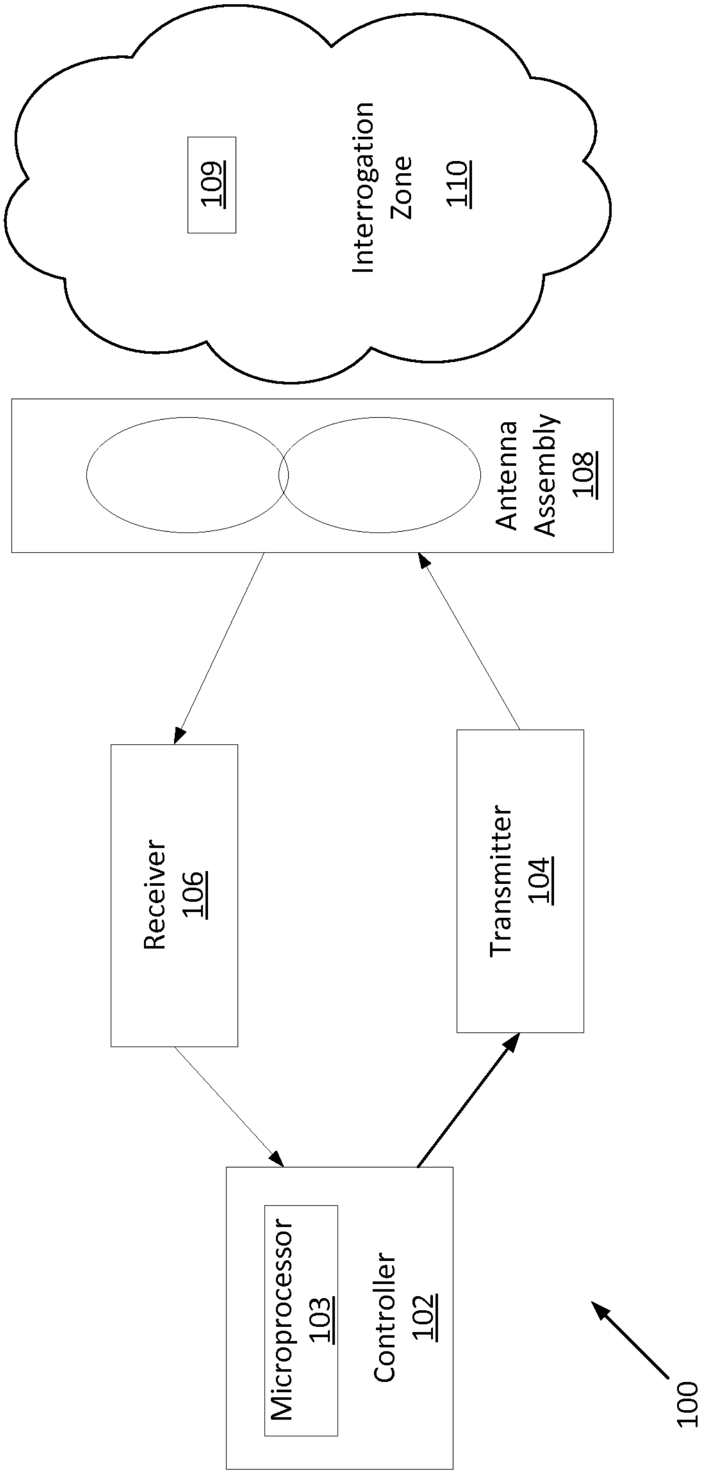
FIG. 1 is a basic block diagram of a representative EAS system

The invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

The invention concerns methods and systems for reducing interference in electronic article surveillance (EAS) systems. The inventive arrangements are particularly well suited for scenarios where a second EAS system (which is not designed to cooperate with a first EAS system for purposes of synchronization) is causing interference with a first EAS system due to improper synchronization. The method is performed in the context of marker tag detection operations. Marker tag detection operations typically involve periodically generating with a first EAS unit synchronized electromagnetic exciter pulses which are configured to force a response in a marker tag when each pulse is transmitted into a tag detection zone. Each synchronized exciter pulse is communicated into an EAS tag detection zone during a pulse transmit time. After termination of the pulse transmit time, a receiver is used to monitor and detect the response from the marker tag during a first receive interval.

According to one aspect of the invention, the first EAS unit transmits an electromagnetic warning pulse at a predetermined time following the exciter pulse. The predetermined time and duration of the warning pulse is chosen so that it acts upon a conventional noise interference avoidance system in a second EAS unit. Such noise interference avoidance systems are well known in the art and therefore will not be described here in detail. However, it is known that such interference avoidance systems will conventionally use a receiver to detect the presence of electrical noise that is present during a receive interval associated with EAS tag detection, and will respond to detected noise during such receive interval by moving a time of its receive interval. For example, the receive interval for EAS tag detection will generally follow shortly after an exciter pulse used to produce a forced response in the EAS tag. Accordingly, changing the transmit time of the exciter pulse will also change the receive time.

In the present invention, the second EAS unit interprets the warning pulse as noise and responds by causing a timing change in the second EAS unit. For example, the second EAS unit can cause a timing change with respect to transmission of a second synchronized electromagnetic exciter pulse which is produced by the second EAS unit. This results in a commensurate change in the time of a receive interval used to detect EAS tag responses in the second EAS unit and allows the second EAS unit to avoid the noise which is present during its receive interval. But the advantage to the first EAS unit is that the second EAS unit is no longer transmitting EAS exciter pulses during the EAS tag detection receive window of the first EAS unit. Accordingly, the noise interference avoidance processing circuitry of the second EAS unit is used by the first EAS unit to cause a timing change in the second EAS unit. Notably, the second EAS unit can be non-cooperative insofar as it is not specifically designed to communicate or cooperate with the first EAS unit for timing synchronization or other purposes. But the first EAS system takes advantage of the existing conventional noise interference avoidance circuitry in the second EAS system to encourage the second EAS unit to change its timing. This timing change causes the second EAS unit to no longer interfere with the first EAS unit.

Marker tag detection operations and the transmitting of the first warning electromagnetic pulse as described herein are performed by the first EAS unit during a first phase of an EAS cycle. The first phase can be followed by a second phase. The second phase can involve sensing with a receiver in the first EAS unit a level of electromagnetic noise in a communication environment during a noise sensing interval. In such a scenario, the inventive arrangements can also involve transmitting using the first EAS unit a second electromagnetic warning pulse at a second predetermined time during the second phase. The second predetermined time and duration of the second warning pulse are advantageously chosen so that the second warning pulse acts upon the noise interference avoidance system in the second EAS unit. This causes a pulse transmission timing change in the second EAS unit which helps to reduce interference experienced by the first EAS unit during the noise sensing interval. The second warning pulse is useful for causing the second EAS unit to avoid transmission of exciter pulses during a noise sensing interval. In general, the first synchronized electromagnetic exciter pulse can be selected to have the same frequency as the first and second warning pulses.

One or both of the first and second warning pulses is modulated to contain encoded information. For example, in some scenarios the modulation scheme can include pulse width modulation and/or amplitude modulation. Optionally, the first and/or second warning electromagnetic pulses can be selectively modulated on and off to form a plurality of shorter duration pulses. The shorter pulses can effectively form a binary code which conveys certain information to other EAS units. One or both of the modulated warning pulses can be received and demodulated at a third EAS unit which is designed to extract the coded information.

From the foregoing it will be appreciated that the first warning pulse described herein can have at least one feature different from the second warning pulse whereby the second warning pulse can be selectively identified in a cooperative third EAS unit. This difference can be utilized to help automatically adjust a timing of at least one transmitted pulse in a cooperative EAS unit. The various aspects of the inventive arrangements will now be described in further detail The basic operation of EAS systems is well known in the art and therefore will not be described here in detail. However, a brief description of an exemplary EAS system is provided to facilitate the following synchronization discussion. Referring now to FIG. 1 there is shown a high level block diagram of a representative EAS system 100. An electronic controller circuit 102, which can include a microprocessor 103, is connected to both a receiver 106 and a transmitter 104. Circuits associated with the receiver 106 and transmitter 104 are connected to an antenna assembly 108. Signals from a receiving antenna are amplified, filtered and detected by the receiver circuit 106, which supplies both amplitude and frequency information to the controller 102. Based on design constraints, which may include program instructions in firmware, the controller has the ability to use transmitter 104 to transmit signals at particular frequencies and particular times for particular durations to the system's environment through a transmitting antenna. More particularly, the signals are designed to produce forced responses by marker tags 109 that are present within an interrogation zone 110 (which is sometimes referred to herein as an EAS marker detection zone). The antenna assembly 108 is comprised of one or more coils serving as the receiving antenna and one or more coils serving as the transmitting antenna. Alternatively, the antenna assembly comprises one or more coils, serving as both the receiving and transmitting antennas.

Figure 2:
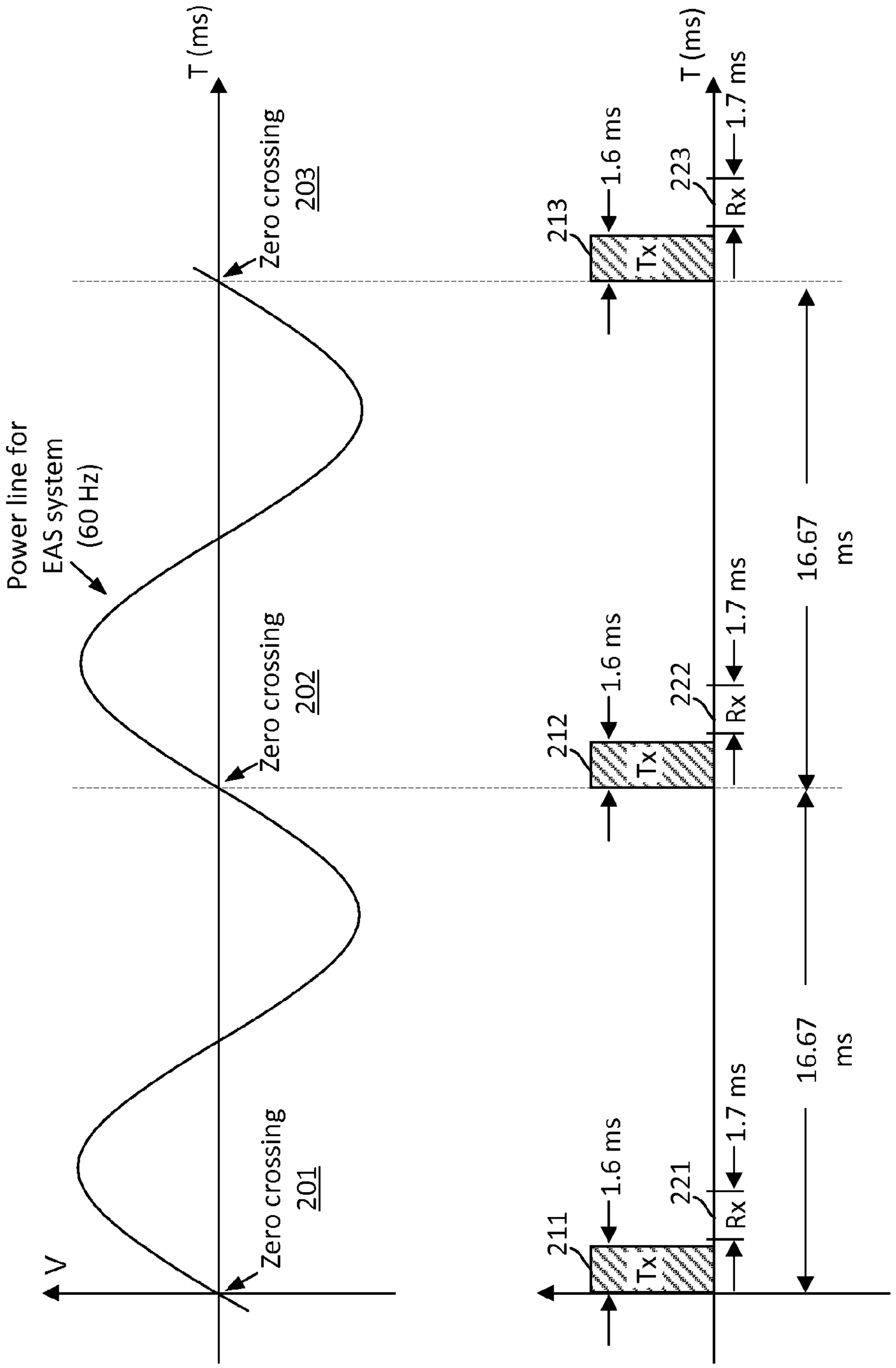
FIG. 2 is a timing diagram that is representative of an EAS system operating at a power line frequency that is synchronized to a zero crossing.
Figure 6:
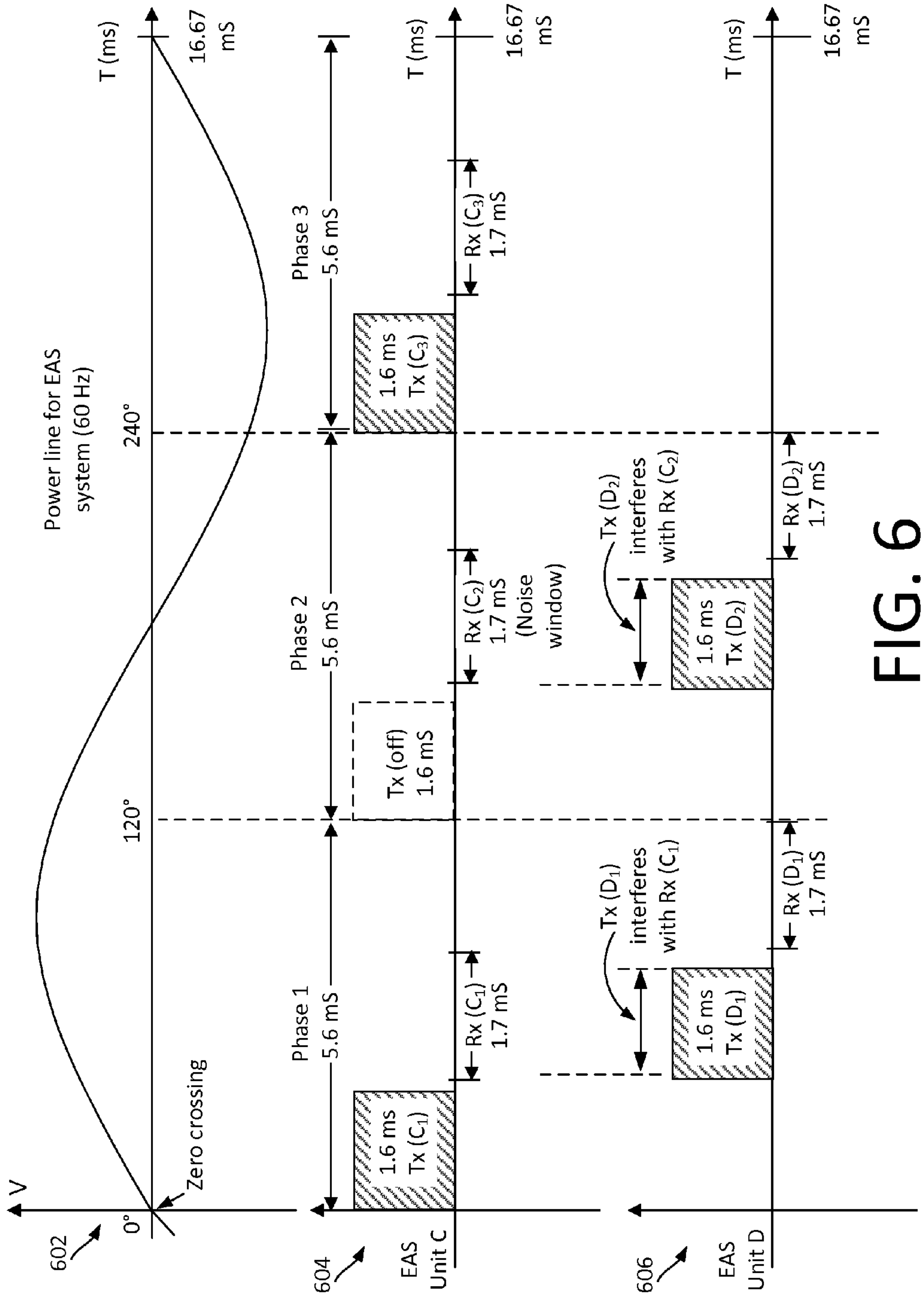
FIG. 6 is a timing diagram that is representative of an EAS system operating at a frequency that is 3× the power line frequency, and which shows how an EAS unit D can interfere with an EAS unit C during a noise receiving interval for EAS unit C.
Figure 7:
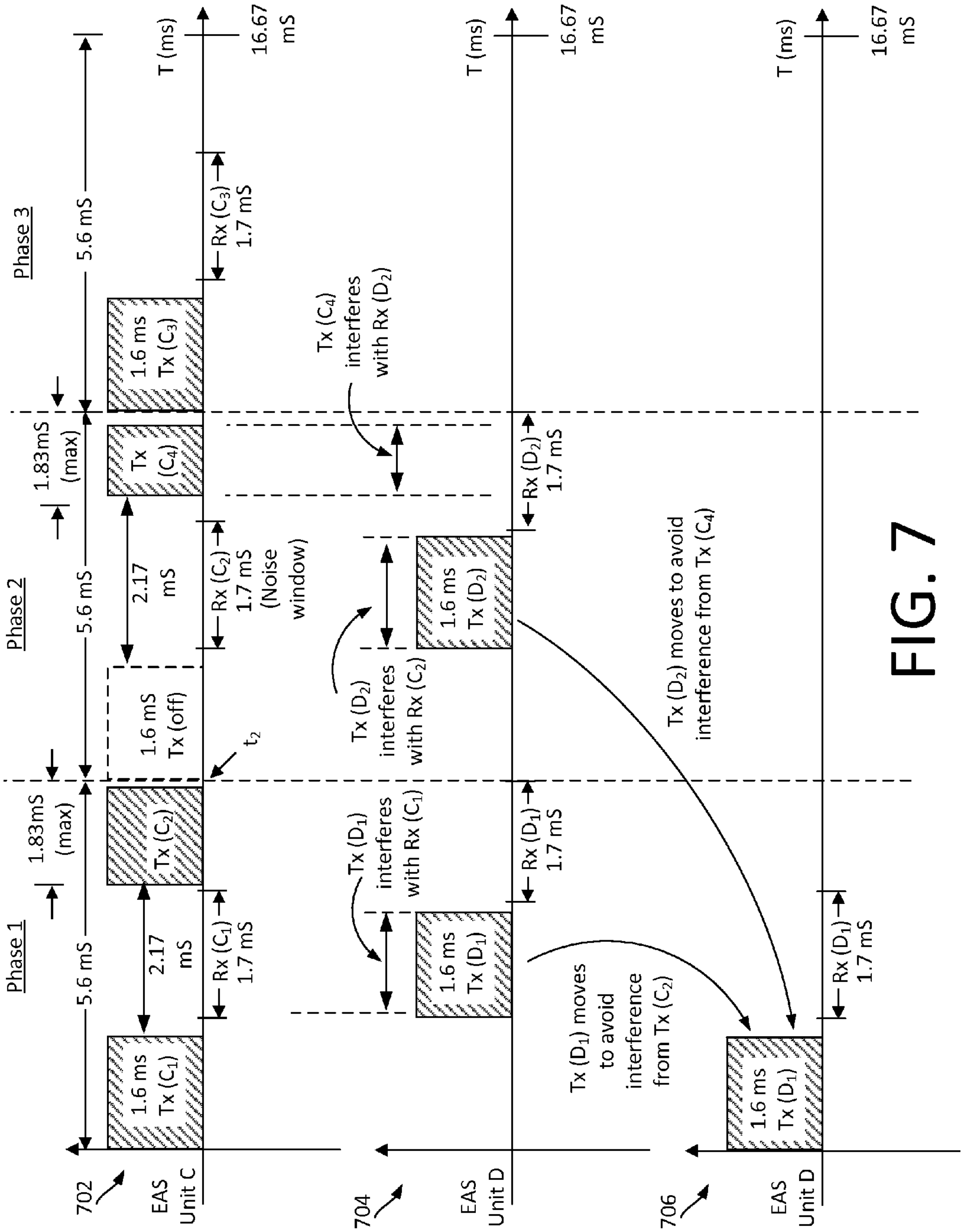
FIG. 7 is a timing diagram that is useful for understanding how an EAS unit C can cause an EAS unit D to change a transmit time by taking advantage of interference avoidance processing provided in EAS unit D.
Figure 8:
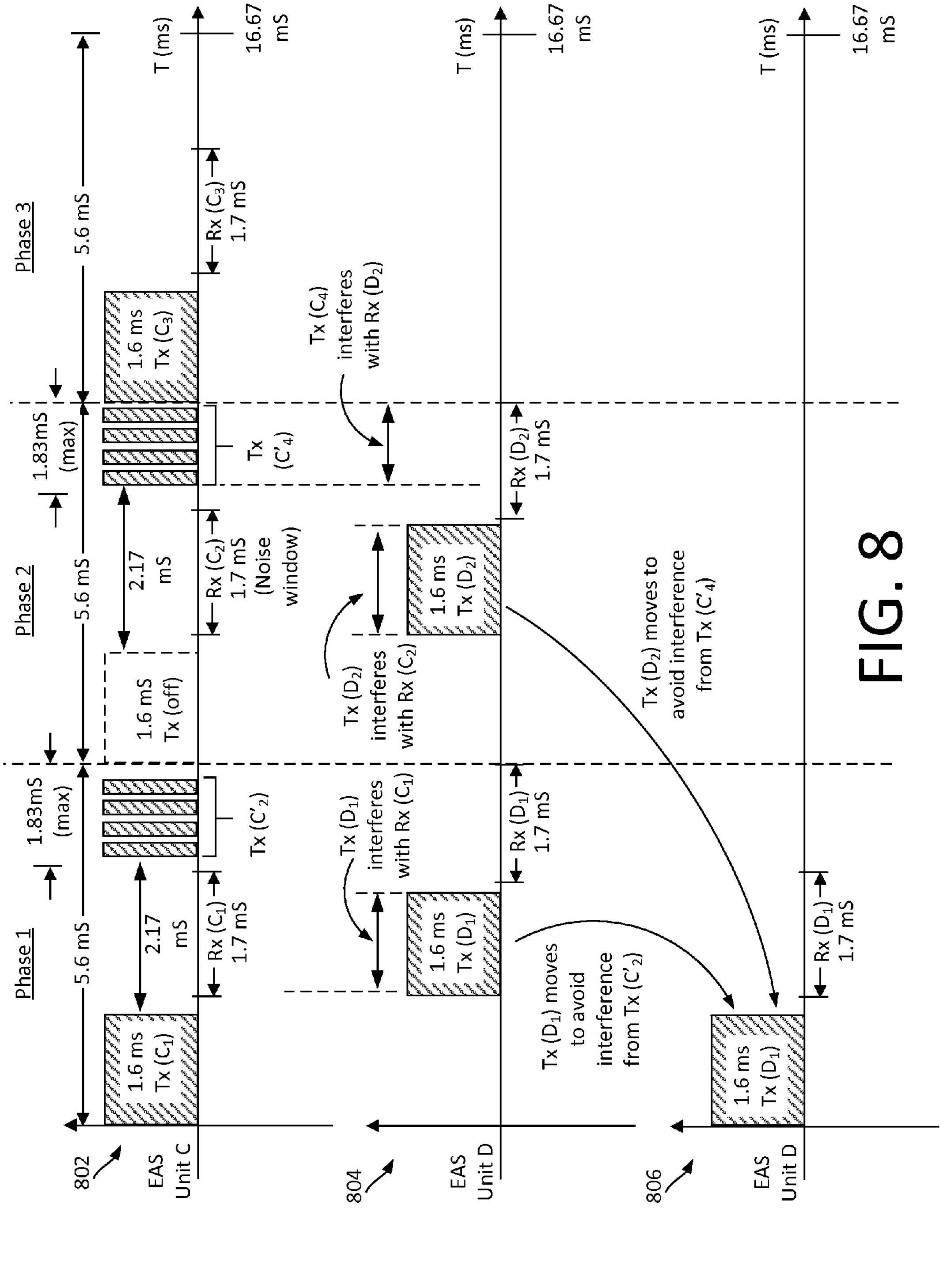
FIG. 8 is a timing diagram that is useful for understanding an alternative implementation of the arrangement described in FIG. 7.

Referring now to FIG. 2 there is provided a timing diagram that is representative of an EAS system operating at a power line frequency. Practical EAS systems commonly operate at higher frequencies to include more transmit pulses (and receive windows) during each cycle of the power line frequency. However, a simplified system is shown in FIG. 2 so as to facilitate a understanding of the inventive concepts described herein. EAS systems operating at higher frequencies are shown in FIGS. 6-8.

As shown in FIG. 2, an EAS system can generate electromagnetic transmit pulses 211, 212, 213 which excite EAS markers 109 which may be present within an interrogation zone 110. In order to synchronize the EAS unit with other EAS units in proximity, a controller of the EAS system monitors the power line to detect zero crossings 201, 202, 203. The transmit pulses are generated in response to detection of a positive going zero crossing. The transmit pulses are propagated by an antenna into an interrogation zone which may contain an EAS marker. An EAS marker is excited by the transmit pulse. When the transmit pulse abruptly terminates, the marker rings down and produces a weak magnetic field, alternating at the marker's natural frequency. A receiver antenna of the EAS system 100 receives the marker's ring down signal during a receive interval 221, 222, 223.

Figure 3:
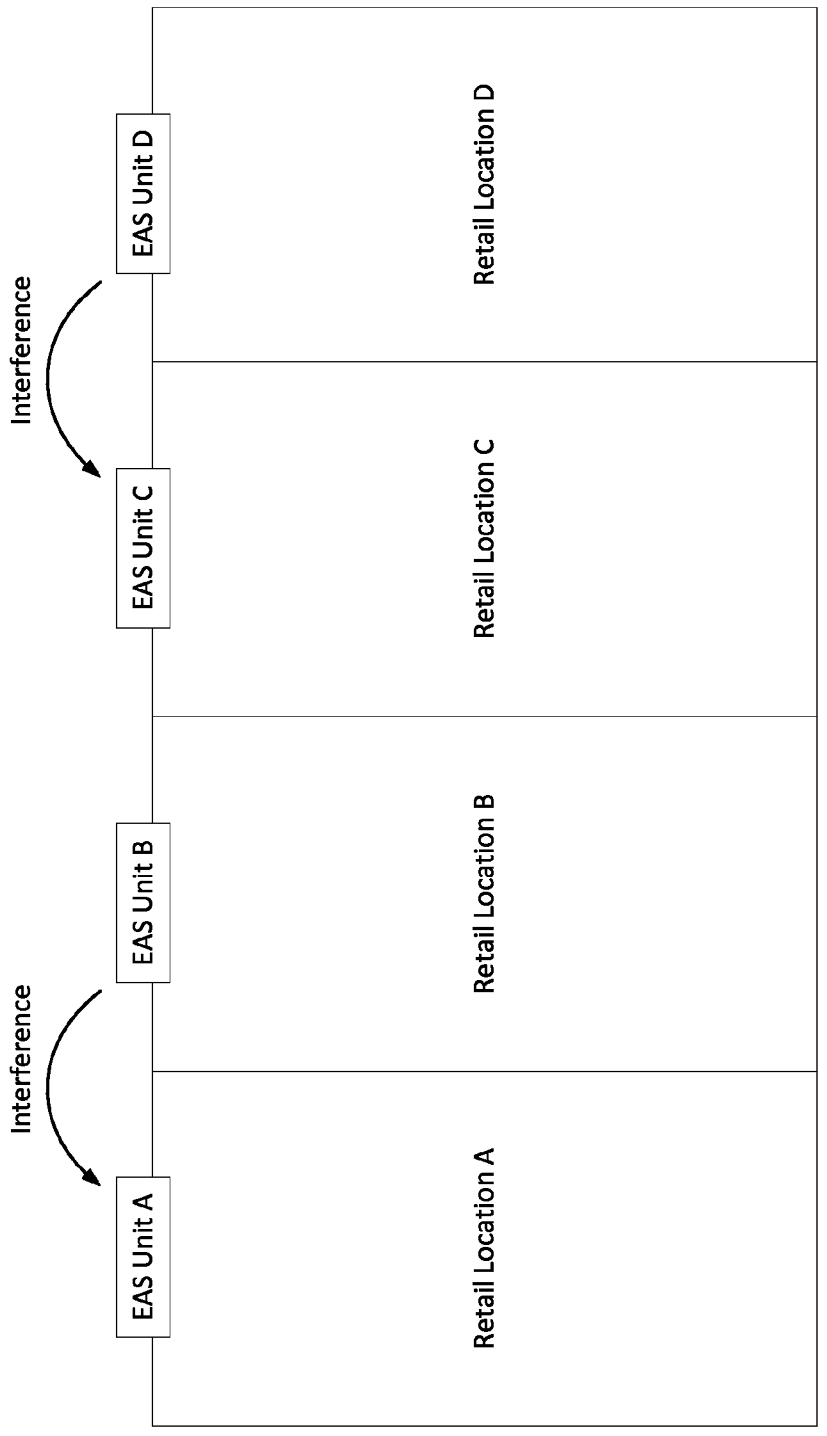
FIG. 3 is a diagram that is useful for understanding how a first EAS unit can receive interference from a second EAS unit.
Figure 4:
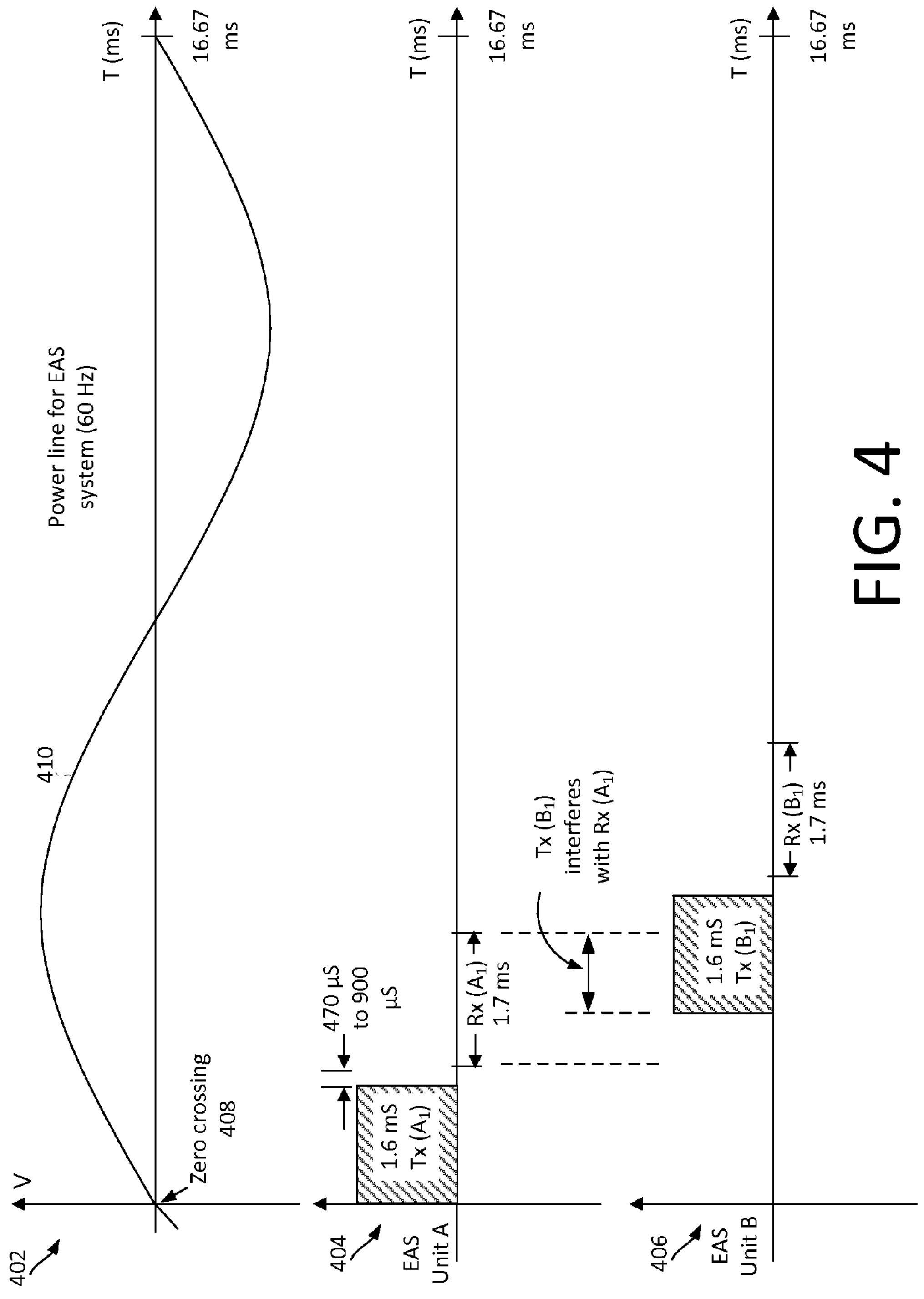
FIG. 4 is a timing diagram that is useful for understanding how an EAS unit B can interfere with and EAS unit A during a receiving interval for EAS unit A.

FIGS. 3 and 4 are diagrams that are useful for understanding how a first EAS unit A can receive interference from a second EAS unit B. In FIG. 3, several different business entities are shown in relatively close proximity at retail locations A, B, C, and D. Retail locations A, B, C, D have respective EAS units A, B, C, and D that operate at the same transmit frequencies and the same EAS marker frequencies.

EAS units A, B, C, and D can use the same frequency to excite marker tags. The frequency of the exciter pulses also correspond to the frequency of the marker tag responses. Accordingly, the receivers in EAS units A, B, C, and D are generally tuned to receive the same frequency as the transmitted exciter pulses. Accordingly, if EAS unit B is not correctly synchronized to EAS unit A, then EAS unit B can cause harmful interference to EAS unit A. This concept is illustrated in FIG. 4 which shows a series of time lines 402, 404, 406. An EAS unit A can produce a transmit pulse Tx ($A_1$) in response to a positive-going detected zero crossing 408 of a power line voltage 410 to which the EAS unit A is connected. In this example the power line voltage is presumed to have a frequency of 60 Hz but a 50 Hz power line voltage is also possible. The transmit pulse Tx ($A_1$) is synchronized to occur immediately following the zero crossing as is the convention in many common EAS systems. In a conventional EAS system this pulse can be 1.6 milliseconds (mS) in duration, but the invention is not limited in this regard. A response of an EAS marker tag to transmit pulse Tx ($A_1$) can be subsequently detected by EAS unit A in a receive interval Rx ($A_1$). For example, a response can be detected when a marker tag is present within a detection zone of EAS unit A. The receive interval in a conventional EAS system can be about 1.7 mS in duration as shown. A guard interval can be provided between the transmit pulse Tx ($A_1$) and the receive interval Rx ($A_1$). A duration of a guard interval in a conventional EAS system can be about 470 μS to 900 μS as shown.

EAS unit B will produce transmit pulses and receive marker responses in a manner similar to that described above with respect to EAS unit A. Accordingly, EAS unit B will have a transmit pulse Tx ($B_1$) followed by a corresponding receive time Rx ($B_1$) during which it attempts to detect an EAS marker response. However, EAS unit B may not be properly aligned to a zero crossing of EAS unit A. For example, this can occur when EAS unit B is not under the control of the person responsible for EAS unit A. Consequently, transmit pulse Tx ($B_1$) may not occur at the same time as transmit pulse Tx ($A_1$) in EAS unit A. In the example shown, transmit pulse Tx ($B_1$) of EAS unit B is generated during a time which at least partially coincides with receive interval Rx ($A_1$) for EAS unit A. Consequently, the transmit pulse Tx ($B_1$) occurs during a time that a receiver of EAS unit A is attempting to detect a marker response. The occurrence of transmit pulse Tx ($B_1$) during receive interval Rx ($A_1$) will degrade the performance of EAS unit A. Notably, EAS unit B will not experience any operational difficulty or interference in such a scenario since its own receive interval Rx ($B_1$) occurs during a time when EAS unit A does not normally transmit. Accordingly, EAS unit B will not be aware of the interference it is causing.

If synchronization of EAS unit B is under the control of the same person responsible for synchronization of EAS unit A, then the improper synchronization of EAS unit B could be manually corrected by a technician. Similarly, if EAS unit A and EAS unit B are each using a common automated synchronization infrastructure, then EAS unit B could be synchronized with EAS unit A. But in some scenarios, EAS unit B is not designed to cooperate with EAS unit A with regard to synchronization, and an entity responsible for operation of EAS unit A may not have control of EAS unit B. Accordingly, there is no practical way for the operator of EAS unit A to prevent EAS unit B from causing interference. In this regard, EAS unit B can be thought of as a non-cooperative EAS unit. In such a scenario, EAS unit A could be manually adjusted to synchronize with the non-cooperative EAS unit B so that both have the same improper synchronization, thereby avoiding interference with EAS unit B. But this tends to lead to further problems with other nearby EAS units which are properly synchronized to the power line zero crossing. What is needed is a way for EAS unit A to cause a non-cooperative EAS unit B to adjust its synchronization.

Figure 5:
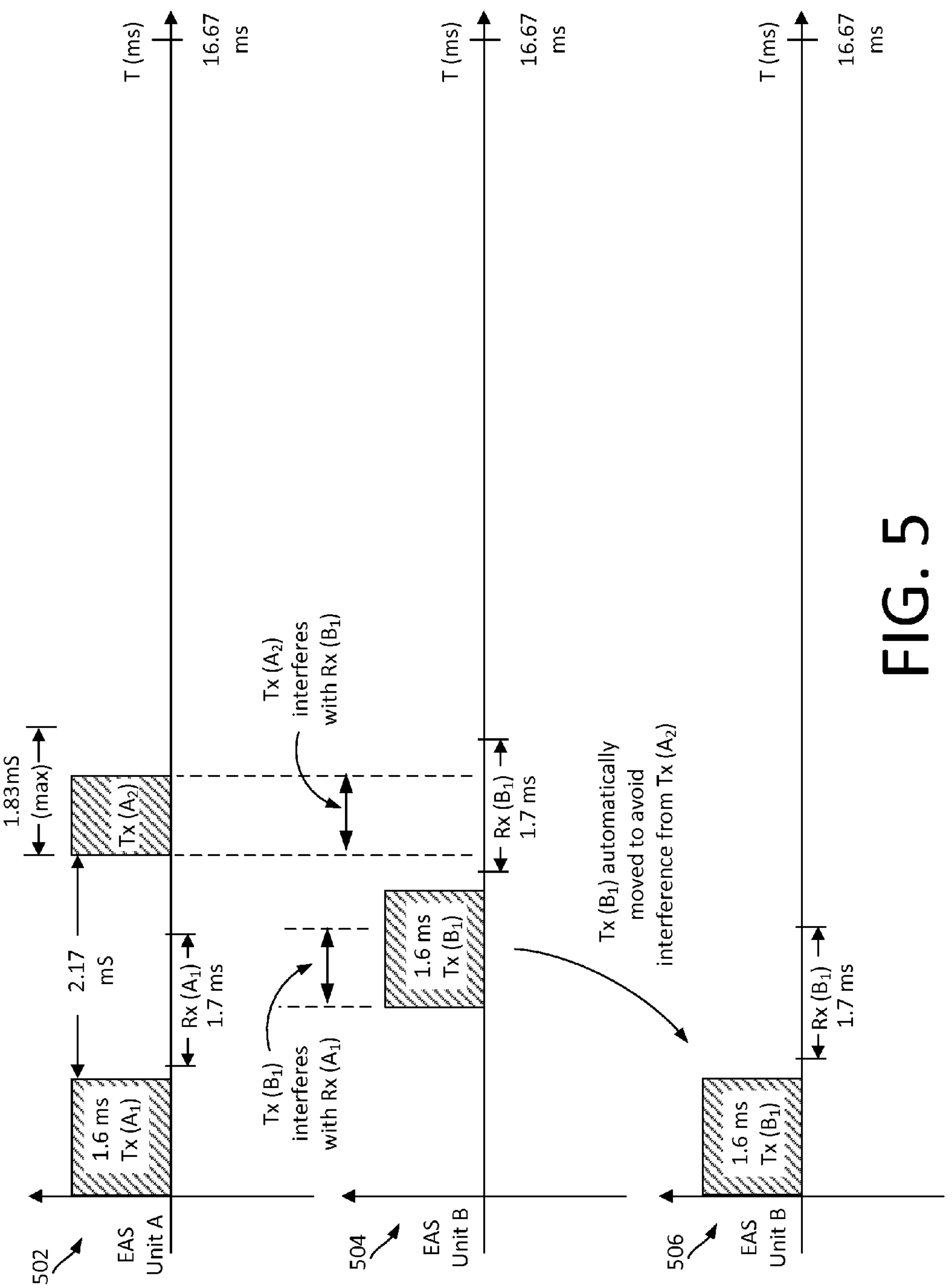
FIG. 5 is a timing diagram that is useful for understanding how an EAS unit A can cause an EAS unit B to change a transmit time by taking advantage of interference avoidance processing provided in EAS unit B.

Referring now to FIG. 5 there is shown a series of timing diagram that are useful for understanding how an EAS unit A can cause a non-cooperative EAS unit B to adjust is synchronization to the power line. The various times shown and described are exemplary of those that can be used in a typical EAS system. However, it should be understood that the method is not necessarily limited to the specific times indicated. The method described herein involves EAS unit A taking advantage of interference avoidance processing that is provided in EAS unit B. In timeline 502 EAS unit A produces a 1.6 mS transmit pulse Tx ($A_1$) during a transmit time in synchronization with a power line zero crossing. The transmit pulse is followed by a 1.7 mS receive interval Rx ($A_2$) during which EAS unit A attempts to receive a response by an EAS marker tag. In timeline 504 a non-cooperative EAS unit B is misaligned and therefore produces a 1.6 mS transmit pulse Tx ($B_1$) during a time corresponding to Rx ($A_1$). Accordingly Tx ($B_1$) interferes with Rx ($A_1$). In order to correct this problem EAS unit A intermittently generates a warning pulse comprised of transmitted pulse Tx ($A_2$) during a receive interval Rx ($B_1$). The transmit pulse Tx ($A_2$) can be transmitted at the same frequency as Tx ($A_1$) or at a different frequency. The timing and duration of the transmitted pulse Tx ($A_2$) is selected so that the pulse acts upon a noise interference avoidance system in the EAS unit B.

The frequency, timing and duration of transmit pulse Tx ($A_2$) is such that it will be detected by EAS unit B during receive time Rx ($B_1$). For example, Tx ($A_2$) can be transmitted approximately 2.17 mS following Tx ($A_1$). Note that the 2.17 mS in this example is the sum of a 470 μS ring down wait time and a 1.7 mS receive interval. This ensures that Tx ($A_2$) will be transmitted concurrently with a receiving interval Rx ($B_1$) of a transmitted pulse Tx ($B_1$) which is interfering with EAS unit A. The duration of Tx ($A_2$) is advantageously chosen so that it sufficient to be detected by EAS unit B within receiving time Rx ($B_1$) whenever Tx ($B_1$) is concurrent with Rx ($A_1$). As used herein, concurrent means that at least a portion of the transmitted pulse is overlapped in time with at least a portion of the receiving time interval. In some embodiments of the invention which shall be described below in greater detail, the duration of Tx ($A_2$) is controlled so that it will not exceed about 1.83 mS. It should be understood that Tx ($A_2$) could be always transmitted following each zero crossing but it can be sufficient to instead transmit Tx ($A_2$) on an intermittent basis. For example, in some scenarios Tx ($A_2$) could be transmitted only once every 10 or 100 cycles of the power line voltage and this can be sufficient to cause a response in EAS unit B. The exact rate at which Tx (A2) can be transmitted can be determined by empirical means.

The EAS unit B is not designed to cooperate in a synchronization scheme with EAS unit A, but it will detect the presence of Tx ($A_2$) during its receive interval. More particularly, a conventional EAS unit will have an ability to sense the presence of "noise" during a receive interval and will have ability to adjust its timing to avoid such noise. EAS unit B will have a conventional noise or interference avoidance system which can include one or more computer processes and/or circuits. Such systems are well known in the art and therefore will not be described in detail. However, the conventional noise interference avoidance system will conclude that Tx ($A_2$) is noise or interference that is degrading its ability to detect marker tags during Rx ($B_1$). Accordingly, EAS unit B will respond by adjusting its timing so that a duration of Rx ($B_1$) coincides with a quiet time interval Rx ($A_1$) as shown in timeline 506. It does this by adjusting its transmit time Tx ($B_1$). The adjustment of the transmit time Tx (B1) will be followed by the adjustment of the receive time Rx ($B_1$) as shown. The automatic timing adjustment is made by EAS unit B so as to avoid the interference caused by Tx ($A_2$). But moving Tx($A_2$) will also cause EAS unit B to avoid interfering with EAS unit A during Rx ($A_1$). Accordingly, EAS unit A will have succeeded in causing uncooperative EAS unit B to move its transmit time to properly synchronize with EAS unit A.

As noted above, conventional EAS systems can have a ring down time for an exciter pulse (e.g. for pulse Tx ($A_1$)) which varies between about 470 μS to 900 μS. The 2.17 mS delay between the end of pulse Tx ($A_1$) and the beginning of pulse TX ($A_2$) assumes a 470 μS ring down time and a 1.7 mS receive window. For systems which have longer ring-down times (e.g. up to 900 μS) this 2.17 second delay can instead be longer (e.g. up to 2.6 mS). In such a scenario, the maximum length of Tx ($A_2$) would have to be adjusted so that it is less than 1.83 mS so that the entire duration of the cycle does not exceed 5.56 mS. For example, if a particular system has a 900 μS ring down time period then the maximum duration of pulse Tx ($A_2$) would need to be reduced to 1.36 mS. Those skilled in the art will appreciate that the invention includes systems incorporating all such timing adjustments and is not limited to the specific timing intervals described herein.

The timing diagrams in FIGS. 4 and 5 are simplified to help illustrate the concept of a synchronization method involving a non-cooperative EAS unit. Referring now to FIG. 6 there is shown a series of time lines 602, 604, 606 that are representative of a more practical EAS system operating at a frequency that is 3× the power line frequency. As illustrated in time line 604 an EAS unit C can operate according to three separate phases during each cycle of a power line voltage. These shall be referred to herein as phase 1, phase 2 and phase 3. Each phase has a duration corresponding to a portion of the power line voltage sine wave equal to about 120°. Accordingly, phases 1, 2 and 3 can respectively begin at approximately 0°, 120°, and 240° as shown. Each phase is approximately 5.6 mS in duration.

Time line 604 shows that in phase 1 an EAS unit C produces a transmitted pulse Tx ($C_1$) at a time (0°) which corresponds to a zero crossing of a power line voltage. EAS unit C has a receiving time interval Rx ($C_1$) during which a receiver attempts to detect an EAS tag which has been excited. Similarly, EAS unit C produces a transmitted pulse Tx ($C_3$) in phase 3 at a time which corresponds to about 240° within the power line cycle. This pulse is followed by a receiving interval Rx ($C_3$). In an exemplary system the transmit pulses can be about 1.6 mS in duration and the receiving intervals can be about 1.7 mS in duration. The transmit and receive pulses can be separated by a guard interval which is usually about 470 μS to 900 μS.

Time line 604 shows that in phase 2, a transmitter is disabled during a transmit time Tx (off) but a receive time interval Rx ($C_2$) is nevertheless provided. Since the transmitter is disabled during the transmit time Tx (Off) there is no response characteristic response expected from an EAS tag during Rx ($C_2$). Instead, Rx ($C_2$) is used to evaluate an electrical noise level to aid in signal processing performed by EAS unit C.

In FIG. 6 it may be observed that a non-cooperative EAS unit D which is not properly synchronized to the power line voltage reference can produce a transmitted pulse Tx ($D_1$) during receive window Rx ($C_1$). This creates a problem similar to that which was previously described in relation to FIG. 4. In particular, Tx ($D_1$) occurs during receive window Rx ($C_1$), thereby potentially degrading tag detection performance of EAS unit C. Alternatively, the improper synchronization of EAS unit D can cause a transmit pulse Tx ($D_2$) to appear during a time corresponding to receiving time Rx ($C_2$). This transmitted pulse will not directly interfere with the ability of EAS unit C to detect the presence of marker tags since no marker tag response is expected during Rx ($C_2$). Still, the occurrence of Tx ($D_1$) during Rx ($C_2$) can be expected to degrade the performance of EAS unit C because EAS unit C will not obtain an accurate estimate of the electrical noise that is present within an environment. Notably, Tx ($D_1$) and Tx ($D_2$) each have a corresponding receive time which is identified respectively as Rx ($D_1$) and Rx ($D_2$). During these receive times EAS unit D attempts to detect the occurrence of forced responses produced by EAS marker tags.

Referring now to FIG. 7 there is provided a series of time lines that are useful for understanding how EAS unit C can cause a non-cooperative EAS unit D to change a transmit time by taking advantage of conventional interference avoidance processing provided in EAS unit D. The various times shown and described are exemplary of those that can be used in a typical EAS system. However, it should be understood that the method is not necessarily limited to the specific times indicated. Time line 702 for EAS unit C is generally similar to time line 604 but includes one or more extra pulses. Specifically time line 702 for EAS unit C can include one or more warning transmit pulses Tx ($C_2$) and/or Tx ($C_4$). These warning pulses could be always transmitted after each zero crossing but it can be sufficient to instead transmit such pulses on an intermittent or periodic basis. For example, in some scenarios the warning pulses could be transmitted only once every 10 or 100 cycles of the power line voltage and this can be sufficient to cause a response in EAS unit D. The exact rate at which the warning pulses can be transmitted can be determined by empirical means. However, it should be appreciated that fewer warning pulses are desirable so as to minimize unnecessary electrical noise in an EAS environment.

The frequency, timing and duration of transmit pulses Tx ($C_2$) and Tx ($C_4$) are such that they will be detected by EAS unit B during receive time Rx ($D_1$) or Rx ($D_2$). For example, Tx ($C_2$) can be transmitted approximately 2.17 mS following Tx ($C_1$). This assumes 470 μS of ring down time following Tx ($C_1$) plus a 1.7 mS receive window. Such timing ensures that pulse Tx ($C_2$) it will be transmitted concurrently with a receiving interval Rx ($D_1$) of a transmitted pulse Tx ($D_1$) that is interfering with EAS unit C. The duration of Tx ($C_2$) is advantageously chosen so that it sufficient to be detected by EAS unit D within receiving time Rx ($D_1$) whenever Tx ($D_1$) is concurrent with Rx ($C_1$). As used herein, concurrent means that at least a portion of the transmitted pulse is overlapped in time with at least a portion of a receiving interval. In order to avoid extending into phase 2, the duration of Tx ($C_2$) in the scenario shown in FIG. 7 is advantageously controlled so that it will not exceed about 1.83 mS. However, this maximum duration may need to be reduced in certain scenarios where the ring down time for Tx ($C_1$) exceeds 470 μS. For example, if the ring-down time for Tx ($C_1$) is actually 900 μS, then the maximum duration width of pulse Tx ($C_2$) cannot exceed 1.36 mS if the pulse Tx ($C_2$) is to avoid extending into phase 2.

Similarly, Tx ($C_4$) can be transmitted approximately 2.17 mS following the end of Tx (off). This ensures that Tx ($C_4$) will be transmitted concurrently with a receiving interval Rx ($D_2$) associated with a transmitted pulse Tx ($D_2$) that is interfering with EAS unit C. The duration of Tx ($C_4$) is advantageously chosen so that it sufficient to be detected by EAS unit D within receiving time Rx ($D_2$) whenever Tx ($D_2$) is concurrent with Rx ($C_2$). As used herein, concurrent means that at least a portion of the transmitted pulse is overlapped in time with at least a portion of a receiving interval. In order to avoid extending into phase 3, the duration of Tx ($C_4$) is advantageously controlled so that it will not exceed about 1.83 mS.

The purpose of Tx ($C_2$) is similar to that of Tx ($A_2$) in FIG. 5. In particular, the occurrence of Tx ($C_2$) is timed to occur during a receive time Rx ($D_1$) for EAS unit D. Consequently processing circuitry in EAS unit D will identify transmit pulse Tx ($C_2$) as noise or interference. In response conventional interference avoidance processing in EAS unit D will transition the pulse timing of Tx ($D_1$) to correspond to the timing shown in time line 607. More particularly, EAS unit D will move Tx ($D_1$) so that its associated receive time Rx ($D_1$) will no longer be concurrent with Tx ($C_2$ Accordingly, a receiver in EAS unit A will no longer experience interference from Tx ($D_1$) during a receive time Rx ($C_1$).

Tx ($C_4$) serves a purpose similar to that of Tx ($C_2$). More particularly, Tx ($C_4$) is timed to occur during a receive interval Rx ($D_2$) of EAS unit D. Consequently processing circuitry in EAS unit D will identify transmit pulse Tx ($C_4$) as noise or interference. In response, conventional interference avoidance processing in EAS unit D will transition the pulse timing of Tx ($D_2$) to avoid interference from Tx ($C_4$). More particularly, EAS unit D will move Tx ($D_2$) so that its associated receive time Rx ($D_2$) will no longer be concurrent with Tx ($C_4$). Notably, the interference avoidance processing in EAS unit D will also move Tx ($D_2$) to avoid interference with Tx ($C_2$). As a result of such timing adjustments performed by EAS unit D, Tx ($D_2$) will ultimately be moved to a location such as the one show in in time line 706, such that its receive time Rx ($D_1$) does not experience interference. Accordingly, a receiver in EAS unit C will no longer experience interference from Tx ($D_2$) during a receive time Rx ($C_2$).

Figure 9:
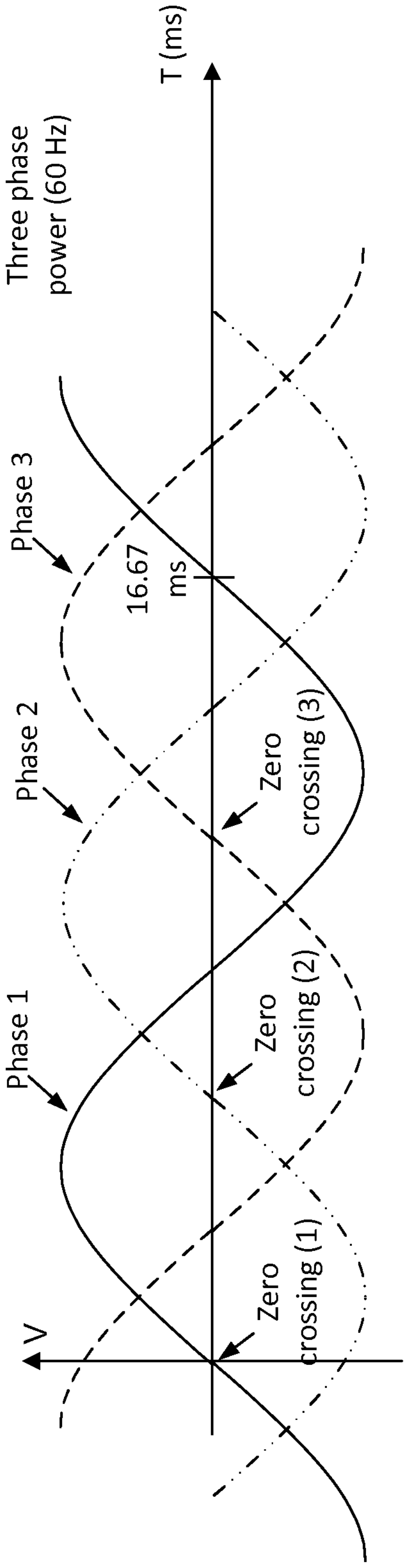
FIG. 9 is useful for understanding a timing relationship among three different voltages associated with a three-phase AC power system.

In an embodiment of the invention, the pulses Tx ($C_2$) and Tx ($C_4$) can be manipulated to serve other functions in addition to those which have already been described. For example, one or both of the pulses can be controlled for communicating certain information to cooperative EAS units that are configured to receive and interpret the pulses. In such a scenario, each of the pulses can be modulated to vary the message that is being communicated. Any suitable form of modulation can be used for this purpose. For example, the amplitude of the pulse can be varied or pulse width modulation can be used to selectively communicate different message information. The messages that are communicated can include any information that is useful for operating an EAS system. For example, the pulses can identify a temperature at an EAS unit or a phase (i.e. phase 1, phase 2, or phase 3) during which the plurality of pulses Tx ($C_2$) and Tx ($C_4$) are being communicated. As explained below, the communication of phase information can be particularly helpful for synchronizing the operation of two or more EAS units that are connected to different wires of a three phase power system As is well known in the art, electric power as provided by electric utilities is commonly supplied in three phases. This concept is illustrated in FIG. 9 which shows three separate voltages at 60 Hz frequency. Phase 2 is approximately 120° out of phase with phase 1. Phase 3 is approximately 240° out of phase with phase 1. In a typical residential or commercial facility, different electrical outlets can be connected to wires carrying phase 1, phase 2 or phase 3. Accordingly, different EAS units may be provided with electric power corresponding to phase 1, phase 2, or phase 3. Although each phase in nominally offset by 120°, inductive loads on a particular circuit within a facility can actually cause the phase of that circuit to shift somewhat. This leads to synchronization problems among EAS units because each unit bases the timing of its transmitted pulses and receive intervals on a zero crossing of its electrical power source. If the phase of one circuit is offset from 120° or 240° then the synchronization of an EAS unit connected to that circuit will be offset from other EAS units on different phases. The Tx ($C_4$) pulse described above can be used to help compensate for these kinds of phase offsets.

As an example, it can be observed in FIG. 7 that Tx ($C_4$) is a relatively shorter duration pulse as compared to Tx ($C_2$). Accordingly, the shorter duration pulse Tx ($C_4$) can be used to signify to other EAS units in proximity that EAS unit C is currently in phase 2. The timing of this pulse Tx ($C_4$) can also be used by proximate cooperating EAS units to adjust their timing. For example, the proximate EAS units can use the timing of Tx ($C_4$) to calculate a particular time $t_2$ that EAS unit C believes to correspond to the beginning of phase 2 since Tx ($C_4$) always occurs a predetermined amount of time following $t_2$. Once the proximate EAS unit determines the time corresponding to $t_2$ in EAS unit C, the proximate EAS unit can adjust its timing to compensate for any power line phase shift. For example, an EAS unit P (which is proximate to EAS unit C) can determines that time $t_2$ at EAS unit C is offset 1.5 mS from the zero crossing at EAS unit P. The 1.5 mS timing offset is due to a phase shift in the power line to which EAS unit P is connected. The EAS unit P can then adjust the timing of its transmitted pulses and receive cycles by 1.5 mS to compensate for the phase offset.

FIG. 8 is a timing diagram that is useful for understanding an alternative implementation of the arrangement described in FIG. 7. The time lines 802, 804, 806 are similar to time lines 702, 704, 706 except that warning transmit pulse Tx ($C'_2$) comprises a series of pulses rather than a single pulse Tx ($C_2$). Similarly, warning transmit pulse Tx ($C'_4$) is comprises of a series of pulses rather than a single pulse Tx ($C_4$). Accordingly, the discussion relating to FIG. 7 is generally sufficient to understand what is shown in FIG. 8. However it should be noted that in FIG. 8 one or both of the transmit pulses Tx ($C'_2$) and Tx ($C'_4$) can each be comprised of a plurality of pulses. In the case of Tx ($C'_2$) the plurality of pulses can begin about 2.17 seconds following a marker excitation pulse Tx ($C_1$). The plurality of pulses can be produced for a period of time which generally should not exceed about 1.83 mS so as to avoid extending into phase 2. This duration assumes a 470 μS ring down period for Tx ($C_1$) and may need to be reduced for longer ring down periods so that Tx ($C'_2$) does not extend into phase 2. Each of the plurality of Tx ($C'_2$) pulses will have a duration which is less than about 900 μS. Similarly, in Tx ($C'_4$) the plurality of pulses can begin about 2.17 seconds following a 1.6 mS Tx (off) time. The plurality of pulses can be produced for a period of time which generally should not exceed about 1.83 mS so as to avoid extending into phase 3. Each of the plurality of pulses will have a duration which is less than about 900 μS.

With respect to non-cooperative EAS unit D, the Tx ($C'_2$) and Tx ($C'_4$) pulses will have substantially the same effect as Tx ($C_2$) and Tx ($C_4$) described above. In effect, these pulses will cause EAS unit D to adjust its timing to avoid interference with EAS unit C. However, an advantage of the multiple pulses in this group is that they can serve other functions as well. For example, the plurality of pulses can be controlled for sending binary coded messages to cooperative EAS units that are configured to receive and interpret the pulses. In such a scenario, the individual pulses can be modulated (switched on or off) to vary the message that is being communicated. The messages that are communicated can include any information that is useful for being communicated from one EAS unit to another EAS unit. For example, the pulses can identify a temperature or a phase (i.e. phase 1, phase 2, or phase 3) during which the plurality of pulses Tx ($C'_2$) and Tx ($C'_4$) are being communicated. If the pulses identify a phase, then the timing of the pulses can also be used to compensate for power line phase shifts as described above.

We claim:

1. A method for reducing interference in an electronic article surveillance (EAS) system, comprising:

performing marker tag detection operations in a first EAS unit including periodically generating with a transmitter a first synchronized electromagnetic exciter pulse configured to force a response in said marker tag when said first synchronized electromagnetic exciter pulse is transmitted into an EAS tag detection zone, communicating said first synchronized electromagnetic exciter pulse into the EAS tag detection zone during a pulse transmit time, and after termination of said pulse transmit time, monitoring with a receiver to detect said response from said marker tag during a first receive interval;

selecting a predetermined time and a duration of a first warning electromagnetic pulse so that said first warning electromagnetic pulse will be transmitted from the first EAS unit concurrent with a second receive interval of a second EAS unit which follows a second synchronized electromagnetic exciter pulse produced by the second EAS unit when the second synchronized electromagnetic exciter pulse is concurrent with said first receive interval, where the second EAS unit performs monitoring operations during the second receive interval to detect a marker tag's response to the second synchronized electromagnetic exciter pulse; and transmitting with said first EAS unit the first warning electromagnetic pulse at the predetermined time, where the first warning electromagnetic pulse acts upon a noise interference avoidance system in the second EAS unit so as to cause an automatic synchronization of transmit and receive operations of the second EAS unit with transmit and receive operations of the first EAS unit in response to the second EAS unit's reception of the first warning electromagnetic pulse during the second receive interval.

2. The method according to claim 1, wherein said marker tag detection operations and said transmitting of said first warning electromagnetic pulse are performed during a first phase of an EAS cycle which is followed by a second phase, and said second phase further comprises:

sensing with said receiver in said first EAS unit a level of electromagnetic noise in a communication environment during a noise sensing interval; and transmitting with said first EAS unit a second warning electromagnetic pulse at a second predetermined time during said second phase.

3. The method according to claim 2, further comprising selecting said second predetermined time and a duration of said second warning electromagnetic pulse so that it is concurrent with a third receive interval which follows a third synchronized electromagnetic exciter pulse produced by the second EAS unit when the third synchronized electromagnetic exciter pulse is concurrent with said noise sensing interval.

4. The method according to claim 2, wherein at least one of the first and second warning electromagnetic pulses is modulated to contain encoded information.

5. The method according to claim 4, wherein said modulating is selected from the group consisting of pulse width modulation and amplitude modulation.

6. The method according to claim 4, wherein at least one of the first and second warning electromagnetic pulses is modulated to form a plurality of pulses.

7. The method according to claim 4, further comprising receiving and demodulating at least one of the first and second warning pulses in a third EAS unit to extract the coded information.

8. The method according to claim 2, further comprising forming the first warning pulse to have at least one feature different from the second warning pulse whereby the second warning pulse can be selectively identified in a third EAS unit.

9. The method according to claim 8, further comprising automatically adjusting a timing of at least one transmitted pulse in the third EAS unit responsive to the second warning pulse.

10. The method according to claim 2, wherein the first synchronized electromagnetic exciter pulse has the same frequency as the first and second warning pulses.

11. The method according to claim 1, wherein the second EAS unit is non-cooperative with respect to maintaining synchronization with the first EAS unit except in response to said warning pulses.

12. The method according to claim 1, wherein the first warning pulses are selected to have a timing and duration which activates an interference avoidance process in the second EAS unit.

13. A method for reducing interference in an electronic article surveillance (EAS) system, comprising:

performing marker tag detection operations in a first EAS unit including periodically generating with a transmitter a first synchronized electromagnetic exciter pulse configured to force a response in said marker tag when said first synchronized electromagnetic exciter pulse is transmitted into an EAS tag detection zone, communicating said first synchronized electromagnetic exciter pulse into the EAS tag detection zone during a pulse transmit time, and after termination of said pulse transmit time, monitoring with a receiver to detect said response from said marker tag during a first receive interval;

selecting a predetermined time and a duration of a first warning electromagnetic pulse so that said first warning electromagnetic pulse will be transmitted from the first EAS unit concurrent with a second receive interval of a second EAS unit which follows a second synchronized electromagnetic exciter pulse produced by the second EAS unit when the second synchronized electromagnetic exciter pulse is concurrent with said first receive interval, where the second EAS unit performs monitoring operations during the second receive interval to detect a marker tag's response to the second synchronized electromagnetic exciter pulse; and transmitting with said first EAS unit the first warning electromagnetic pulse at the predetermined time, where the first warning electromagnetic pulse acts upon a noise interference avoidance process in the second EAS unit so as to cause a timing change for the second synchronized electromagnetic exciter pulse produced by the second EAS unit when the second synchronized electromagnetic exciter pulse is concurrent with said first receive interval.

14. The method according to claim 13, wherein said marker tag detection operations and said transmitting of said first warning electromagnetic pulse are performed during a first phase of an EAS cycle which is followed by a second phase, and said second phase further comprises:

sensing with said receiver in said first EAS unit a level of electromagnetic noise in a communication environment during a noise sensing interval; and transmitting with said first EAS unit a second warning electromagnetic pulse at a second predetermined time during said second phase.

15. The method according to claim 14, further comprising selecting said second predetermined time and a duration of said second warning electromagnetic pulse so that said second warning electromagnetic pulse acts upon a noise interference avoidance process in the second EAS unit to cause a pulse transmission timing change in the second EAS unit.

16. The method according to claim 15, further comprising communicating phase information to at least a third EAS unit using said second warning electromagnetic pulse.

17. An system for reducing interference in and electronic article surveillance (EAS) unit, comprising:

a first EAS unit including a transmitter, a receiver and a controller arranged to control operation of the receiver and the transmitter;

said controller configured to control marker tag detection operations in said first EAS unit by causing said transmitter to periodically generate a first synchronized electromagnetic exciter pulse configured to force a response in said marker tag when said first synchronized electromagnetic exciter pulse is transmitted into an EAS tag detection zone, causing said first synchronized electromagnetic exciter pulse to be transmitted into the EAS tag detection zone during a pulse transmit time, after termination of said pulse transmit time, causing said receiver to monitor to detect said response from said marker tag during a first receive interval, causing the transmitter to transmit a first warning electromagnetic pulse at a predetermined time following said first synchronized electromagnetic exciter pulse, where the first warning electromagnetic pulse is transmitted concurrent with a second receive interval of a second EAS unit which follows a second synchronized electromagnetic exciter pulse produced by the second EAS unit when the second synchronized electromagnetic exciter pulse is concurrent with said first receive interval, said second EAS unit performs monitoring operations during the second receive interval to detect a marker tag's response to the second synchronized electromagnetic exciter pulse; and controlling said predetermined time and a duration of said first warning electromagnetic pulse so that said first warning electromagnetic pulse acts upon a noise interference avoidance system in a second EAS unit so as to cause a timing change for a second synchronized electromagnetic exciter pulse produced by the second EAS unit when the second synchronized electromagnetic exciter pulse is concurrent with said first receive interval.

18. The system according to claim 17, wherein said controller is configured so that the marker tag detection operations and said transmitting of said first warning electromagnetic pulse are performed during a first phase of an EAS cycle which is followed by a second phase, and the controller is configured so that during said second phase the controller causes the receiver to sense a level of electromagnetic noise in a communication environment during a noise sensing interval; and causes the transmitter to transmit a second warning electromagnetic pulse at a second predetermined time during said second phase.

19. The system according to claim 18, wherein said controller is configured to select the second predetermined time and a duration of said second warning electromagnetic pulse so that said second warning electromagnetic pulse acts upon a noise interference avoidance system in the second EAS unit to cause a pulse transmission timing change in the second EAS unit.

20. The system according to claim 19, wherein said controller is configured to cause a pulse width of the second electromagnetic warning pulse to be different as compared to the first electromagnetic warning pulse.

* * * * *